Patented July 21, 1936

2,047,945

UNITED STATES PATENT OFFICE 2,047,945

CATALYSTS AND METHOD OF PREPARING AND USING SAME

Herrick R. Arnold, Elmhurst, and Wilbur A. Lazier, Marshallton, Del., assignors to E. I. du Pont de Nemours & Company, Wilmington, Del., a corporation of Delaware No Drawing. Application August 18, 1932, Serial No. 629,306

10 Claims. (Cl. 23—236)

This invention relates to the preparation and use of improved contact masses for catalytic reactions. More particularly it relates to the preparation of modified ferrous metal catalysts for use in various catalytic reactions wherein one or more of the reactants are carbon compounds. Specifically, the invention relates to improvements in hydrogenation and dehydrogenation processes.

The metals of the ferrous group comprising the elements iron, cobalt, and nickel, have long been known as catalysts for various organic reactions and have been the subject of numerous patents and other publications. As the result of an extended series of studies carried out in the vapor phase, Sabatier and his co-workers have characterized these metals as catalysts for the hydrogenation and dehydrogenation of a wide variety of organic compounds. These investigators found that nickel and its compounds were by far the most active catalysts of the group, with cobalt and iron following in the order named. Many and varied applications of these metals as catalysts have since been developed, despite the fact that their prolonged use is often rendered difficult on account of poisoning and a tendency to sinter at the higher temperatures. The use of nickel as a catalyst in the vapor phase is further complicated by the specific tendency of this element to bring about splitting of carbon-carbon bonds with the resultant degradation of useful products to carbon and gaseous carbon compounds. Other difficulties have been encountered in the use of iron and cobalt owing to the relatively high temperatures required for activation which render them inapplicable for many reactions that proceed best at temperatures lower than 400° C.

For these reasons, satisfactory vapor phase and high temperature catalysts comprising the ferrous metals or their compounds have been uncertain to prepare, and their behavior in catalytic reactions difficult to control.

This invention has as an object the development of improved catalysts of the ferrous metal type through the use of non-ferrous metal modifying agents. A further object is the preparation of new compositions of matter suitable for use as catalysts in reactions involving the hydrogenation or dehydrogenation of organic or other carbon compounds. A further object pertains to the use of these catalysts in hydrogenation and dehydrogenation reactions. Other objects will become apparent from the following description of the invention.

We have now discovered that by incorporating small amounts of one or more low-melting metals of the non-ferrous type whose oxides are easily reducible, with catalysts consisting substantially of the ferrous metals or their compounds, the severity of action of these metals, particularly nickel, in splitting carbon-carbon bonds is ameliorated without substantial impairment of activity toward the gas phase hydrogenation or dehydrogenation of organic compounds.

Our investigations indicate further that at temperatures below which iron and cobalt catalysts are ordinarily active for the dehydrogenation of alcohols, these catalysts tend to cause considerable dehydration to olefines and water. We have found, however, that when small amounts of modifying metals of the type above mentioned are incorporated, dehydration is repressed and the performance of these catalysts for dehydrogenation is greatly improved.

In the following examples there are set forth several catalyst compositions prepared in accordance with this invention, together with methods for their use in catalytic reactions, and comparative data showing the advantages to be gained through following the teachings of this specification.

*Example I.*—A cadmium-modified nickel-chromium oxide catalyst was prepared as follows: One hundred twelve g. of cadmium sulfate ($4H_2O$) and 1,048 g. of nickel nitrate ($6H_2O$) were dissolved in two liters of water. To this solution, heated to 70° C., there was added with stirring 2 liters of a solution containing 608 g. of neutral ammonium chromate. Additional ammonium hydroxide was then added to bring the mixture to neutrality to litmus, after which the precipitate was allowed to settle. The mother liquor was drawn off, and the precipitate washed by decantation, filtered, dried at 110° C. and ignited at 400° C. The product was compressed into tablets which were broken and the grains screened to 14–18 mesh.

This catalyst was employed experimentally in the catalytic dehydrogenation of ethyl alcohol at atmospheric pressure. Three cc. of the catalyst was placed in a glass reaction tube having a diameter of 20 mm. in such a manner as to form a disc-shaped catalytic screen. The catalyst was given a preliminary reduction with hydrogen at 325° C. after which absolute ethanol vapor was passed through at the rate of 87 cc. of liquid alcohol per hour. There was formed per hour 11.7 liters of gas consisting of 2.7% carbon dioxide, 4.6% carbon monoxide, 1.3% ethylene, 83.9% hydrogen, and 7.4% methane, representing an overall conversion of 26.9% of the alcohol to various products including 24.3% to aldehyde and hydrogen. No carbon was deposited on the catalyst.

By way of showing the advantage gained in the use of a small amount of cadmium in the catalyst, a plain nickel chromite catalyst prepared by the method described but without the use of cadmium was tested under the same conditions. This catalyst gave 21.4 liters of gas per hour having the composition 6.2% carbon dioxide, 19.6% carbon monoxide, 1.9% ethylene, 36.2% hydrogen, and 36.1% methane, representing a 22% conversion of the alcohol to such useless products as water, methane and oxides of carbon. Any aldehyde that may have been formed was quantitatively decomposed to the foregoing products, with the deposition of large amounts of carbon on the catalyst.

*Example II.*—A cadmium-modified nickel catalyst supported on kieselguhr was prepared as follows: Five hundred twenty-two grams of nickel nitrate ($6H_2O$), and 62 grams of cadmium nitrate ($4H_2O$) were dissolved in 2 liters of water and 200 grams of commercial kieselghur added. This mixture was held at 70° C. while a solution of 572 grams of sodium carbonate ($10H_2O$) in 6 liters of water was added dropwise over a period of 8 hours with moderate agitation. The precipitate thus formed was washed five times by decantation with 14 liters of water each time, after which it was filtered and dried at 110° C. A sample of the dry product was compressed into tablets which were broken and the grains screened to 14–18 mesh.

A 3 cc. sample of this catalyst was reduced in place with hydrogen for 4 hours at 450° C. in the reaction equipment described in Example I. The catalyst was used for the dehydrogenation of ethyl alcohol at atmospheric pressure. Experimental conditions were as described in Example I. There was formed per hour, 18.6 liters of gas consisting of 2.2% carbon dioxide, 9.7% carbon monoxide, 1.2% ethylene, 75.5% hydrogen, and 9.8% methane, representing a conversion of 0.6% to ethylene and water, 32.3% to aldehyde and hydrogen, and 5.4% to methane, oxides of carbon and hydrogen.

By way of showing the improvement gained in the use of small amounts of cadmium in the catalyst composition, a plain nickel catalyst supported on kieselguhr was prepared by exactly the same method but without the use of cadmium. When tested in the same manner the catalyst gave 25.9 liters of gas per hour, the composition of which was 7.0% carbon dioxide, 19.0% carbon monoxide, 1.0% ethylene, 36.4% hydrogen, and 36.7% methane, which represents a conversion of 0.5% of the alcohol to ethylene and water, and 24.2% to methane, oxides of carbon, and hydrogen, any aldehyde formed being quantitatively decomposed to the foregoing products, with large amounts of carbon deposited on the catalyst.

*Example III.*—A cadmium-modified cobalt chromite catalyst was prepared in the manner described in Example I except that cobalt nitrate was substituted for nickel nitrate in an equivalent amount. A 3 cc. sample of this catalyst was pre-reduced with hydrogen and tested for the catalytic dehydrogenation of ethyl alcohol under the conditions described above.

Ninety-four cc. of alcohol passed over the catalist per hour resulted in the formation of 9.18 liters of gas, the composition of which was 1.3% carbon dioxide, 0.3% carbon monoxide, 3.5% ethylene, 93.5% hydrogen, and 1.4% methane. This represents a conversion of 0.8% of the alcohol to ethylene and water, 21.5% to aldehyde and hydrogen, and 0.3% to methane, oxides of carbon, and hydrogen, or an overall conversion of 22.6%.

The advantage obtained by the use of a small amount of cadmium in the cobalt catalyst composition is shown by the fact that a catalyst prepared in the same manner, but containing no cadmium when tested under similar conditions gave only 1.67 liters of gas per hour, analyzing 0.6% carbon dioxide, 0.2% carbon monoxide, 24.0% ethylene, 70.2% hydrogen, and 1.6% methane, corresponding to conversions of only 1.1% of the alcohol to ethylene and water, 3.3% to aldehyde and hydrogen, and 0.1% to methane, oxides of carbon, and hydrogen, or an overall conversion of only 4.5%.

*Example IV.*—The nickel-cadmium chromite catalyst described in Example I was employed in the high-pressure synthesis of ethyl acetate from ethyl alcohol. Ethyl alcohol was pumped into a vaporizing chamber maintained at a temperature above the critical temperature of the alcohol where it was converted to vapor. This vapor was then conducted over 12.5 cc. of the catalyst at a temperature of 380° C., and at a rate equal to 32 cc. of liquid alcohol per cc. of catalyst per hour. The uncondensed gases formed during the reaction were released from the reaction system at a rate sufficient to maintain a pressure on the system of 200 atmospheres.

Under these conditions 14.4% of the alcohol was converted to ethyl acetate, 1.4% of acetic acid, and 20.9% to valuable higher boiling products consisting principally of esters and alcohols, such as butanol, butyl acetate, hexanol, and ethyl caproate.

The advantage obtained by the use of cadmium as a catalyst component was made apparent when it was found that a catalyst consisting only of nickel chromite prepared in the same manner and tested under conditions identical with the above, was so drastic in its action on the alcohol as to decompose it almost quantitatively to gaseous products, such as hydrogen, oxides of carbon, and methane. The reaction was accompanied by the deposition of large amounts of carbon. Only at temperatures lower than 340° C. was it possible to eliminate the destructive side reactions, but at this temperature only 2.6% ethyl acetate, and 4.5% of high boiling products were obtained, and carbon was deposited on the catalyst.

*Example V.*—An iron-cadmium chromite catalyst was prepared in the manner described in Example I, except that iron was substituted for nickel in equivalent proportions. This catalyst was used for the synthesis of ethyl acetate from ethyl alcohol under the conditions described in Example IV. Under said conditions 18.3% of the alcohol was converted to ethyl acetate, 5.8% to useful higher boiling products, and 1.0% to acetic acid.

On the other hand, an iron chromite prepared in the same way without the inclusion of cadmium, yielded only 6.9% ethyl acetate, 2.6% of useful higher boiling products, and 0.2% acid.

*Example VI.*—A chromite catalyst consisting of nickel cobalt, and cadmium chromites in the mole ratios 45:45:10, respectively, was prepared in the manner described in Example I, except that half the nickel nitrate was substituted by an equivalent amount of cobalt nitrate. This catalyst, when employed in the synthesis of ethyl acetate from ethyl alcohol under the conditions described in Example IV, converted 24.8% of the alcohol to ethyl acetate, 12.4% to useful higher boiling esters and alcohols, and 1.6% to acetic acid.

By way of comparison a similar catalyst which contained no cadmium yielded 4.6% ethyl acetate, 13.8% of higher esters and alcohols, and 0.4% acid.

*Example VII.*—A catalyst consisting of cobalt, cadmium and mercury chromites in the mole ratio 82.5:10.0:7.5, respectively, was prepared in the manner described in Example I. When employed in the synthesis of ethyl acetate from ethyl alcohol under the conditions described in Example IV, this catalyst converted 14.0% of the alcohol to ethyl acetate, 4.8% to useful higher boiling esters and alcohols, and 0.6% to acid.

*Example VIII.*—Under conditions similar to Example VII, a catalyst comprising nickel, tin, and cadmium chromites in the mole ratio 82.5:10.0:7.5, respectively, gave 19% conversion of ethyl alcohol to ethyl acetate, and 11.8% to higher boiling products.

The above examples describe the utility of the new catalysts for the dehydrogenation of ethyl alcohol. They are useful generally for the dehydrogenation of alcohols, particularly the primary alcohols, e. g., ethyl, propyl, butyl and higher primary alcohols. They are also useful for the dehydrogenation of secondary alcohols, e. g., isopropyl and secondary butyl alcohols, etc.

*Example IX.*—The modified ferrous metal catalysts are also applicable to the process of hydrogenating carboxylic acids and their derivatives as demonstrated in the following example:

A mixture of 200 g. of ethyl oleate and 15 g. of reduced catalyst prepared as described in Example II, was agitated for 5 hours at a temperature of 325° C. and under a hydrogen pressure of about 3,000 lbs. per sq. in. Hydrogenation of the carbethoxy group proceeded smoothly with the formation of ethanol and a mixture of 9,10-octadecenyl and octadecyl alcohols and the corresponding hydrocarbon products.

*Example X.*—One hundred cc. of the catalyst described in Example VI was used for the hydrogenation of the ethyl esters derived from linseed oil. The ester mixture together with hydrogen in the mole ratio 1:10 was passed over the catalyst at a space velocity of 5 cc. of liquid ester per cc. of catalyst per hour. At 385° C. and a reaction pressure of 2,500 lbs. per sq. in. the catalyst converted over 95% of the ester to the corresponding alcohols and hydrocarbons.

The conditions described in Examples IX and X for the hydrogenation of carboxylic esters, will apply generally to the hydrogenation of carboxylic acids themselves, particularly those of the aliphatic and hydroaromatic type, and to their amides, acid chlorides and salts.

*Example XI.*—A cadmium-modified nickel catalyst prepared as described in Example II is inactive for converting a mixture of carbon monoxide and hydrogen to methane at temperatures below 400° C. However, at higher temperatures, for example, between 450 and 600° C., the reaction proceeds smoothly and completely with a minimum of carbon deposition, whereas an unmodified nickel catalyst soon becomes inoperative through the excessive deposition of carbon at the higher temperatures.

The catalysts of the present invention comprise substantially the elements iron, cobalt, or nickel, which are classified in the upper tier of the eighth group of the Periodic Table of Mendeléeff. They have atomic weights in the range 55–59, and on account of their similarity in chemical properties, are often referred to as the ferrous metals. Where the term "ferrous metal" is used in the specification or in the claims it will be intended to include only the elements iron, cobalt, and nickel. In the catalysts of this invention, these elements may exist in the form of oxides or other compounds, or in a wholly or partially reduced condition. Besides the addition of modifying agents in the manner disclosed, the elements of the ferrous metal group may be employed advantageously in combinations with each other.

Suitable modifying agents for ferrous metal catalysts comprise the non-ferrous metals cadmium, indium, tin, mercury, thallium, lead, and bismuth. While we make no claim to having discovered the mechanism of the modifying action on ferrous metal catalysts, we have perceived that the non-ferrous metals named above have certain properties in common which may contribute to the desired effect. All are metals which form oxides that are very readily reduced with hydrogen in the dry state at temperatures below 350° C. and may therefore be termed easily or readily reducible oxides. Secondly, all of the modifying agents are low melting metals, the melting points of which are also below 350° C. Consideration of the temperatures indicated in the examples shows that under the conditions ordinarily employed, the modified ferrous metal catalysts must contain metallic modifiers in a liquid condition. The atomic weights of the non-ferrous modifying metals fall into two groups, cadmium, indium, and tin, having atomic weights between 112 and 114, and mercury, thallium, lead, and bismuth, having atomic weights between 200 and 209.5.

The modified catalysts which are the subject of this invention may be prepared by a number of different methods without departing from the spirit or scope of the invention. The methods used may involve mixing, grinding, ignition or co-precipitation of the various catalyst components. In the examples we have indicated that the catalyst compositions may be formed as precipitates by adding suitable reagents to mixed solutions of the appropriate salts. The precipitating agent may be an alkali or a salt which will deposit an insoluble hydroxide, carbonate, or salt of an oxygen-containing acid. Good results have been obtained through the use of soluble chromates as precipitating agents, but a similar result may be obtained by the use of other soluble salts of acidic oxides, e. g., manganates, tungstates, and vanadates. When ammonium chromate is used, a mixture of double ammonium salts is formed which on ignition yields mixed chromites of high catalytic efficacy. When preparing the catalysts in the form of hydroxides or carbonates it may be desirable to use an inert supporting material such as silica gel, kieselguhr or activated charcoal.

The amount of modifying agent may be varied within wide limits. In general, suitable concentrations are found to be between 1 and 25 mole percent of the total amount of ferrous metal used.

These catalysts may be used in the reduced or unreduced state. If reduced, the reduction may be carried out with any suitable reducing medium such as hydrogen, carbon monoxide, or alcohol, or in any of these media diluted with an inert gas such as nitrogen or carbon dioxide. In many cases, the catalysts may be reduced in the vapors or liquids of the reacting materials. The temperature of reduction is preferably about 450-475° C. but satisfactory reductions may be carried out at temperatures varying from 300° C. to 550° C.

The catalysts of this invention are capable of use under a wide variety of conditions. They may be used for vapor or liquid phase reactions at sub-atmospheric, atmospheric, or super-atmospheric pressures, and, depending considerably upon the type of reaction in question, may be used over a wide range of temperatures varying from 100° C. for some of the more reactive organic compounds to 350-600° C. in the dehydrogenation of alcohols and hydrogenation of carbon monoxide. Dehydrogenation of alcohols to esters is preferably carried out at 250°-500° C. and under superatmospheric pressure, and the hydrogenation of carboxylic acids and their derivatives preferably takes place at temperatures above 200° C. and under superatmospheric pressure.

Catalysts of the type disclosed in this invention may be used advantageously in any catalytic reaction which involves the hydrogenation or dehydrogenation of organic or other carbon compounds. For example, they may be used in the synthesis of methanol and higher alcohols or methane from carbon monoxide and hydrogen, hydrogenation of aliphatic or aromatic unsaturated compounds such as olefines, aldehydes, ketones, carboxylic acids or their salts, esters, amides, or chlorides, and compounds containing unsaturated aromatic nuclei. In the field of dehydrogenation reactions these catalysts may be used advantageously in the production of aldehydes or ketones from alcohols at atmospheric pressure, and esters and higher alcohols under superatmospheric pressure.

The principal advantage to be gained in the use of the catalysts disclosed in this invention lies in the fact that the modifying agents used destroy the inherent tendency of the ferrous metals to cause degradation of useful products to carbon and gaseous compounds which have relatively small commercial value. An advantage of equal worth is that the use of the prescribed agents greatly increases the activity of catalysts of the ferrous metal type toward the production of useful products. For example, the inclusion of 10 mole percent of cadmium in a cobalt chromite catalyst increases its conversion of ethyl alcohol to acetaldehyde from 3.3% to 21.5%, while the incorporation of a similar amount of cadmium in a nickel cobalt chromite catalyst increases its conversion of ethyl alcohol to ethyl acetate under pressure from 4.6% to 24.8%.

Other advantages accruing to the use of these promoted catalysts are: they inhibit the tendency of iron and cobalt to cause dehydration of alcohols to olefines and water, and contribute to a greater ease of control resulting from the elimination of erratic thermal effects, plugging due to carbon deposition, etc.

When the terms "oxide of a metal", "oxide of a ferrous metal", and similar terms are used, they are intended to include compounds or compositions containing the oxide either physically admixed with or chemically combined with other oxides. Thus, for example, the term "comprising nickel oxide" is intended to include nickel oxide, mixtures of nickel oxide and chromium oxide, and nickel chromite which is a loosely combined or associated compound of nickel oxide and chromium oxide, and may be written as $NiO.Cr_2O_3$. The term "oxides" also includes hydroxides, carbonates, and similar compounds in which the oxide is present in the combined state.

The above description and specific examples are illustrative only, and are not intended to limit the scope of the invention. Any modification thereof or variation therefrom is intended to be included within the scope of the claims.

We claim:

1. A hydrogenation-dehydrogenation catalyst comprising essentially a mixture of nickel chromite and cadmium chromite.

2. A hydrogenation-dehydrogenation catalyst comprising essentially a mixture of nickel chromite, cobalt chromite, and cadmium chromite.

3. A hydrogenation-dehydrogenation catalyst comprising essentially a mixture of a reduced nickel chromite and a reduced cadmium chromite.

4. A hydrogenation-dehydrogenation catalyst comprising essentially a mixture of a reduced nickel chromite, a reduced cobalt chromite, and a reduced cadmium chromite.

5. A hydrogenation-dehydrogenation catalyst comprising essentially a mixture of a cadmium chromite and a chromite of a metal of the class consisting of cobalt and nickel.

6. A hydrogenation-dehydrogenation catalyst comprising essentially a mixture of a cadmium chromite and a cobalt chromite.

7. In a process for catalytically hydrogenating or dehydrogenating chemical compounds, the step which comprises contacting said compounds with a hydrogenation-dehydrogenation catalyst comprising essentially a mixture of a cadmium chromite and a chromite of a metal of the class consisting of cobalt and nickel.

8. In a process for catalytically hydrogenating or dehydrogenating chemical compounds, the step which comprises contacting said compounds with a hydrogenation-dehydrogenation catalyst comprising essentially a mixture of a cadmium chromite and a nickel chromite.

9. In a process for catalytically hydrogenating or dehydrogenating chemical compounds, the step which comprises contacting said compounds with a hydrogenation-dehydrogenation catalyst comprising essentially a mixture of a cadmium chromite and a cobalt chromite.

10. In a process for catalytically hydrogenating or dehydrogenating chemical compounds, the step which comprises contacting said compounds with a hydrogenation-dehydrogenation catalyst comprising essentially a mixture of a cadmium chromite, a nickel chromite, and a cobalt chromite.

HERRICK R. ARNOLD.
WILBUR A. LAZIER.